United States Patent Office 3,103,770
Patented Sept. 17, 1963

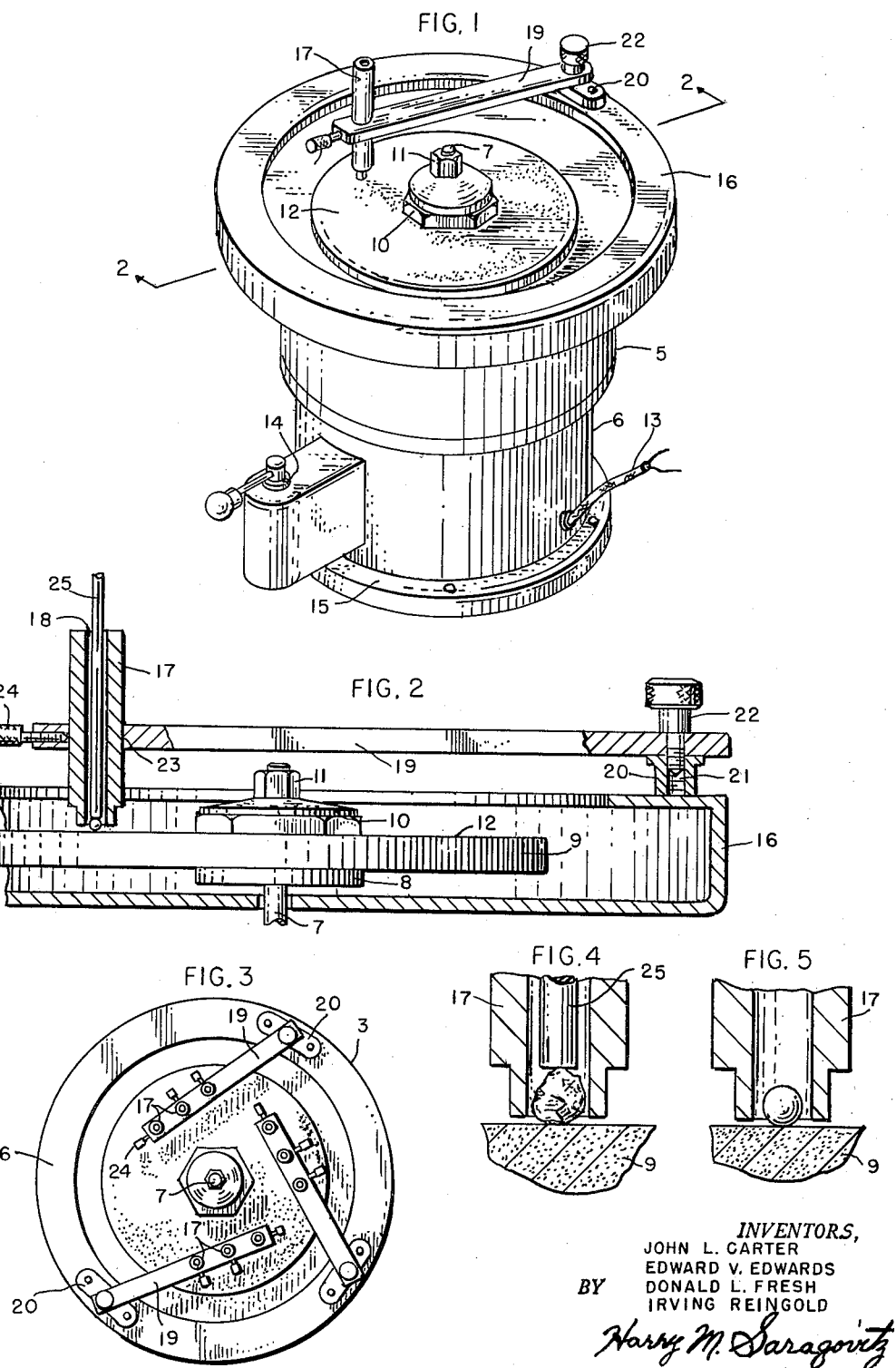

3,103,770
TECHNIQUE FOR SHAPING CRYSTALLINE SPHERES
John L. Carter, Asbury Park, Edward V. Edwards, Neptune, and Irving Reingold, Deal Park, Deal, N.J., and Donald L. Fresh, Maricopa County, Ariz., assignors to the United States of America as represented by the Secretary of the Army
Filed Aug. 31, 1960, Ser. No. 53,319
2 Claims. (Cl. 51—289)

This invention relates to an abrading technique for shaping spheres from ceramic or crystalline materials including ferrite or ferrite type materials.

Conventional techniques for producing spheres such as metallic balls for use in ball bearings or similar fabricating operations have been found entirely unsuitable to the formation of spheres made of ceramic type materials.

In the high frequency field of the electronic arts a requirement exists for accurately formed small spheres of ferrite or ferrite type materials. The present invention was found to provide the necessary technique to fabricate these spheres rapidly and efficiently. Prior to the present invention the fabrication of ferrite or ferrite type materials was found to be difficult and slow. The technique of the present invention performs in a highly satisfactory manner in the shaping of these materials.

In its broad aspect the invention provides means for holding and presenting to the abrading means a small irregularly shaped workpiece of the material to be processed larger than the diameter of the finished sphere. The holding means is tubular and must have a bore large enough to permit the workpiece to rotate therein in any direction. Desirably the holding means is supported vertically and acts to position the workpiece in contact with a driven abrasive wheel whose surface is disposed close to the end of the holding means and perpendicular thereto. The tube-like structure of the holding means permits work pieces to be fed into the device from its upper end.

In operation the abrasive wheel engages the workpiece causing it to rotate upon randomly changing axes and simultaneously abrade the high areas thereof in a random manner until the workpiece assumes a true spherical shape.

It is a primary object of the invention to provide a technique for forming true spherical shapes in materials characterized by their crystalline structure such as materials of ceramic-like character including materials such as ferrite.

A further object of the invention is to provide a technique for simultaneously guiding and abrading a workpiece to form it into true spherical shape.

A still further object of the invention is to provide a technique capable of rapidly and accurately shaping spheres in ceramic type materials such as ferrite or ferrite type materials without the attendance of a highly trained mechanic.

A further object of the invention is to provide technique for fabricating small spheres from ferrite or ferrite type materials which are accurate as to shape and dimension for use in critical components such as high frequency limiters used to protect sensitive receivers for radar systems and in frequency filters for electronic devices.

Other objects and features of the invention will more fully appear from the following description and will be particularly pointed out in the claims.

To present a better understanding of the invention, a particular embodiment thereof will be described and a means for practicing the invention is illustrated in the accompanying drawing wherein:

FIG. 1 is a perspective view of the invention.
FIG. 2 is a cross section on line 2—2 of FIG. 1.
FIG. 3 is a plan view of the apparatus wherein a plurality of work holding devices are used.
FIGS. 4 and 5 illustrate the appearance of the workpiece before and after completing the forming operation.

A desirable embodiment of the apparatus is shown in FIG. 1 wherein a frame or casing 5 incloses a driving motor 6 desirably positioned with its shaft 7 vertical. The upper end of the shaft is provided with a collar 8 fixed thereto. An abrasive wheel 9 is slipped over the shaft and tightened in position against the collar 8 by means of a second collar 10 and a nut 11. Thus the side face 12 of the wheel is horizontal and presented upward to constitute the working abrasive surface. The motor is connected to an input line 13 and is controlled by a switch 14.

The casing 5 has a bottom flange 15 by means of which the device may be secured to a suitable support. The upper end of the casing is shaped to form an annular receptacle 16 to catch abraded material thrown outward by the wheel 9.

It will be understood that other forms of abrading devices may be used. At flat metallic disc may be clamped upon the motor shaft and a sheet of abrading material adhered to its upper face.

Special means are provided for holding the workpieces while they are processed. The holding means consists essentially of a tube 17 held perpendicular to the face 12 of the wheel. The tube may be made of any suitable material such as stainless steel or other metal, Teflon or other plastic material or may be a metallic tube lined with plastic. The bore 18 of the tube is made larger than the major diameter of the unprocessed workpieces to provide for their free movement in the bore. Desirably the bottom portion of the tube wall is reduced in diameter to provide better observing conditions at the point of abrasion and to provide free clearance for the escape of chips.

Adjustable means are provided for holding the tube in working position. Any suitable means may be used. As shown a supporting bar 19 is secured to the upper wall of the receptacle 16. The securing means may consist of a base 20 rigidly attached to upper receptacle wall by screws or other features and is provided with a threaded aperture 21. The outer end of the bar 19 has an aperture therein thru which a thumb nut 22 extends and engages in the threaded aperture 21. When tightened, the thumb nut serves to hold the bar 19 in rigid horizontal position.

The inner end of the bar 19 is provided with an aperture 23 within which the tube 17 is received and secured with a thumb nut 24. The tube 17 is adjusted vertically until its bottom end is close to the wheel surface 12. The clearance between tube and wheel should be such that the tube will positively embrace the workpiece and also provide clearance for chips to escape.

After the workpiece has been inserted in the tube a rod 25 of polystyrene or other suitable material, having a diameter less than the bore 18, is placed in the bore to engage the workpiece and serve as a weight to hold it in engagement with the wheel 9. The weight of the rod speeds up the abrading operation. The lateral position of the tube 17 may be adjusted by swinging the arm 19 about the thumb nut 22 as a pivot and tightening the nut to maintain the adjusted position.

The output of the machine may be increased by providing several supporting arms arranged around the periphery of the receptacle 16 as shown in FIG. 3. More-over each arm may be made to receive several tubes 17 made adjustable and locked in position by thumb nuts in the same manner as above described.

For different sized spheres additional tubes 17 are provided each having a bore of the proper size to process the particular sized sphere desired. A wide variety of sizes may be processed and they may be as small as .025 inch in diameter or smaller. The speed of the wheel 12 may be varied to suit the existing working conditions and consistent with quality results.

In operation a workpiece is placed in the tube 17 and the rod 25 placed in position. The motor is then started which causes the workpiece to be rapidly rotated while it is being abraded by the wheel. The forces acting under such conditions automatically cause the workpiece to rotate when randomly changing axes and thus to engage the wheel in a completely random manner. The resulting abrading of the workpiece produces a true sphere.

The workpiece may be of very rough contour prior to processing. No preliminary shaping is required. The usual procedure is to break up a large piece of the material by striking with a hammer or other means to reduce it to small pieces. Broken pieces of the material of substantially the correct size are then selected for processing. The selected pieces must be sufficiently large to enable the operator to produce a sphere of the required size.

The desired diameter is obtained by adjusting the time of the processing. Thus the whole operation is under the complete control of the operator. When multiple work holding tubes 17 are employed the operator may devote individual attention to the workpieces being processed. To check the workpieces the operator need only stop the wheel and raise the tube until the workpiece is free to be removed for examination. If necessary the workpiece is replaced and processing resumed.

For certain uses of the spheres the finish thereon must be especially smooth and accurate. In such cases it is desirable to execute the processing in two stages. A first operation uses a grinding wheel of relatively coarse grit such as 60 mesh while for the final finishing operation the coarse wheel is removed and a wheel having 150 mesh grit is placed upon the shaft 7. It should be noted however that other grit sizes may be used depending upon a specific requirement. It has been found that the final processing step is best performed without the rods 25.

While the invention has many uses, some of which are pointed out above, a particularly valuable application thereof is in the preparation of ferrite or ferrite type samples which may be accurately evaluated as to their electrical and electromagnetic characteristics when shaped into smooth accurate spherical form.

What is claimed is:

1. A technique for shaping spheres from crudely shaped crystalline workpieces of ceramic-like material comprising inserting the workpieces one at a time in a vertical tubular holder open at top and bottom having its bores slightly greater than the maximum dimension of the workpiece, presenting the workpiece to a flat abrasive surface, the workpiece having all its total bulk situated at distances from its center of gravity having relatively low ratios, rapidly moving said abrading surface in a plane perpendicular to said holder and close to the bottom end thereof, causing the protruding areas of said workpieces to be engaged by said abrading surface to remove portions thereof as the workpiece is given universal rotation about constantly changing axes within its own boundaries and permitting free upward movement thereof whereby removal of material from the workpiece will take place according to a natural geometrical pattern to form a sphere.

2. A technique for shaping spheres from crudely formed crystalline workpieces of ceramic like material according to claim 1 and applying a small weight to act downward upon the workpiece during the sphere shaping operation.

References Cited in the file of this patent

UNITED STATES PATENTS

| | | |
|---|---|---|
| 422,966 | Ormsby | Mar. 11, 1890 |
| 779,646 | Gorton | Jan. 10, 1905 |
| 2,075,216 | Mancuso | Mar. 30, 1937 |
| 2,115,404 | Spaanbroek | Apr. 26, 1938 |
| 2,382,099 | Rothauser | Aug. 14, 1945 |
| 2,703,470 | Porter et al. | Mar. 8, 1955 |
| 2,734,317 | Bond | Feb. 14, 1956 |
| 2,842,906 | Carter et al. | July 15, 1958 |
| 2,895,261 | Day et al. | July 21, 1959 |
| 2,912,799 | Boettcher | Nov. 17, 1959 |

FOREIGN PATENTS

| | | |
|---|---|---|
| 124,329 | Russia | Jan. 31, 1959 |
| 725,251 | Germany | Sept. 17, 1942 |